(12) United States Patent
Weisser

(10) Patent No.: US 6,250,169 B1
(45) Date of Patent: Jun. 26, 2001

(54) POWER TRANSMISSION SYSTEM WITH A GEARWHEEL AND A TOOTHED RACK

(75) Inventor: Fritz Weisser, St. Georgen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/205,465

(22) Filed: Dec. 4, 1998

(30) Foreign Application Priority Data

Dec. 5, 1997 (DE) .............................................. 197 53 897

(51) Int. Cl.$^7$ .......................... F16H 27/02; F16H 29/02; F16H 29/20
(52) U.S. Cl. ............................................. 74/89.17; 74/422
(58) Field of Search .................................. 74/89.17, 425, 74/422, 89.18, 89.19, 530; 369/219, 44.14

(56) References Cited

U.S. PATENT DOCUMENTS

| | | | |
|---|---|---|---|
| 4,151,753 | * 5/1979 | F'Geppert | 74/31 |
| 4,258,580 | 3/1981 | Lowe | 74/109 |
| 4,887,477 | * 12/1989 | Hauser et al. | 74/89.17 |
| 4,958,335 | 9/1990 | Takeda et al. | 369/44.14 |
| 5,025,433 | 6/1991 | VanHeusden et al. | 369/44.14 |
| 5,167,166 | * 12/1992 | Ruhlman | 74/502.4 |
| 5,224,391 | * 7/1993 | Schlechta | 74/89.18 |
| 5,485,445 | 1/1996 | Oinoue et al. | 369/56 |
| 5,727,422 | 3/1998 | Kammerer | 74/89.17 |
| 5,886,977 | 3/1999 | Ota et al. | 369/219 |

FOREIGN PATENT DOCUMENTS

| | | | |
|---|---|---|---|
| 3928496 A1 | 3/1991 | (DE) | G05G/7/02 |
| 124 353 | 11/1984 | (EP) | G11B/7/08 |
| 0329234A1 | 8/1989 | (EP) | G11B/7/085 |
| 0529589A2 | 3/1993 | (EP) | G11B/7/085 |
| 0688975A1 | 12/1995 | (EP) | F16H/19/00 |
| WO95/08172 | 3/1995 | (WO) | G11B/21/02 |

OTHER PUBLICATIONS

Patent Abstracts of Japan, vol. 014, No. 228, May 15, 1990, and JP 2–57756, Pub. date Feb. 27, 1990.
Patent Abstracts of Japan, vol. 014, No.345, (P–1083), Jul 26, 1990 and JP 02122481, Pub. date Oct. 5, 1990.
European Search Report citing the above–listed references: AA, AB, AM, AN, AO, AP, and AR.
*Corresponds to EP0688975A1, cited under reference AM.
*Corresponds to WO95/08172, cited under reference AP.

* cited by examiner

Primary Examiner—Sherry Estremsky
Assistant Examiner—Tisha D. Lewis
(74) Attorney, Agent, or Firm—Joseph S. Tripoli; Paul P. Kiel

(57) ABSTRACT

A power transmission system with a gearwheel and a toothed rack, having an engagement securing system that ensures increased power transmission and protection of the toothing in the end region of the rack. According to the invention the engagement securing system comprises a lug disposed on the rack, which lug engages a guide connected to the gearwheel. In the exemplary embodiment the guide comprises a groove disposed on a disk coupled to the gearwheel. Advantageously, no additional individual parts are required. The range of applications includes an automatic transport securing system in recording or playback equipment for optical, magneto-optical or other recording media, as well as other rack drive systems that require increased power transmission in the end region of the rack.

13 Claims, 2 Drawing Sheets

POWER TRANSMISSION SYSTEM WITH A GEARWHEEL AND A TOOTHED RACK

FIELD OF THE INVENTION

The invention relates to a power transmission system with a gearwheel and a toothed rack which ensures increased power transmission and protection of the toothing in the end region of a toothed rack and can be used as an automatic transport securing system in recording or playback equipment for optical, magneto-optical or other recording media as well as for other rack drive systems with increased power transmission in the end region of the rack.

BACKGROUND OF THE INVENTION

Recording or playback equipment for optical or magneto-optical recording media, such as for example laser disc, compact disc, minidisc or DVD players, are generally known. In such recording or playback equipment, a scanning device provided in the form of a movable writing or reading system is used for reading the information or data from the recording medium or recording it on the recording medium. The writing or reading system is arranged on a carriage, which is movable in order to be able to follow the track of the recording medium to be read or recorded onto. For the carriage to be movable, a rack which is driven by a gearwheel is provided on the carriage. The scanning device provided in the form of a movable writing or reading system is in this case either provided as a so-called linear drive or comprises a coarse drive and a fine drive. In the case of the scanning device comprising a coarse and fine drive, the coarse drive is provided as the carriage, on which the fine drive is arranged. This construction corresponds to a so-called CD-Mechadeck, as used for example in CD players. Such a CD-Mechadeck may, however, also be designed and used as a writing or reading system for other recording media, such as for example DVD or minidisc. The writing or reading system driven by a gearwheel via a toothed rack has a mass which causes the toothing of the rack and/or gearwheel to be damaged, in particular if the equipment is subjected to strong vibration during transport. In addition, to save an additional drive for a loading or unloading device for the recording medium, it is desirable to ensure the transmission of a high level of power with the drive system comprising the gearwheel and toothed rack, so that the loading or unloading device for the recording medium can be driven directly by the carriage. An obvious strengthening of the gearwheel and rack to ensure a higher power transmission and to prevent damage during transport is ruled out as a solution to the problem, however, since it involves increased expenditure on material and requires more space.

SUMMARY OF THE INVENTION

It is an object of the invention to provide a power transmission system with a gearwheel and a toothed rack which ensures increased power transmission and protection of the toothing and can be used as an automatic transport securing system in recording or playback equipment for optical recording media without strengthening the gearwheel and rack.

This object is achieved by features specified in the main claims. Advantageous designs and developments are specified in subclaims.

One aspect of the invention is to provide a power transmission system with a gearwheel and a toothed rack which ensures increased power transmission and protection of the toothing. For this purpose, an engagement securing system is provided. Since a strengthening of the gearwheel and rack is ruled out as a solution, the starting point is for increased power transmission and protection of the toothing to be ensured by an engagement securing system which ensures secure engagement of the teeth of the gearwheel and the rack even under the conditions of increased power transmission between the gearwheel and the rack.

A further aspect of the invention is that the number of individual parts of the power transmission system comprising the gearwheel and the rack is not increased. This rules out the possibility of increased power transmission being accomplished by an additional clamping means for a shaft clamped only at one end, on which shaft the gearwheel is guided, even though a shaft clamped only at one end is to be regarded as one of the causes for the rack displacing the gearwheel out of its position and for the teeth coming into engagement with one another in another position. So-called chattering of the teeth of the rack over the teeth of the gearwheel disadvantageously leads to the teeth of the rack and/or gearwheel being damaged. On account of the high accuracy requirements which the guiding of the carriage with the rack and gearwheel have to meet for the tracking of the writing or reading system for optical recording media, such damage cannot be allowed. Therefore, an engagement securing system is provided to solve the problem. The engagement securing system of the power transmission system with a gearwheel and a toothed rack for movable writing or reading systems for optical recording media is preferably provided in the end region of the rack, since this is the customary position of the writing or reading system for optical recording media during the transporting and the loading or unloading of the recording medium. According to one design of the engagement securing system, the engagement securing system is formed by a lug of the toothed rack which engages in a guide connected to the gearwheel. The guide connected to the gearwheel is in this case preferably formed by a groove which is provided in a disk connected to the gearwheel. The lug of the rack engaging in the guide or groove of the disk of the gearwheel forms an engagement securing system, since it prevents displacement of the position of the gearwheel with respect to the rack and, as a result, the teeth of the gearwheel and rack cannot come into engagement with one another in another position. The clamping of the gearwheel and rack achieved with the lug and the guide ensures increased power transmission in the region of the engagement securing system. A gearwheel guided on a shaft clamped at one end can no longer be displaced out of its position by the rack. As a result, the engagement securing system both forms an automatic transport securing system and ensures increased power transmission, which can advantageously be used for driving a loading or unloading device for the optical recording medium. An additional drive for the loading or unloading device for the optical recording medium is saved as a result.

BRIEF DESCRIPTION OF THE DRAWINGS

The invention is explained in more detail below in an exemplary embodiment with reference to drawings, in which.

DETAILED DESCRIPTION OF THE PREFERRED EMBODIMENTS

The same designations are used throughout the figures. Represented in FIG. 1 is the basic diagram of a CD-Mechadeck, as used in principle, in a known way, in CD, minidisc or DVD players.

The CD-Mechadeck comprises a turntable DT for receiving the recording medium. The turntable DT represented in FIG. 1 is intended for receiving a CD and is adapted for receiving other recording media, such as for example a minidisc. It is driven by a turntable motor DM, which sets the recording medium (not shown) in rotation via the turntable DT. The rotating recording medium is then scanned or recorded onto by a writing or reading system PU, referred to as a pick-up. For this purpose, the writing or reading system PU is provided in such a way that it can be moved on a carriage, in order to be able to follow the track of the recording medium. For the carriage to be movable, a guide rail FS and a toothed rack ZS arranged on the carriage, or on the writing or reading system PU, are provided. In the case of the exemplary embodiment represented in FIG. 1, the rack ZS is driven via a second gearwheel ZR2 and a first gearwheel ZR1 by a pinion RM of a coarse drive motor TM, which is arranged on a shaft W of the coarse drive motor TM. However, the invention is not restricted to a drive having a plurality of gearwheels ZR1, ZR2. It is also not important for the invention whether the rack ZS of the design represented in FIG. 1 is correspondingly of a two-part or one-part design. The two-part design of the rack ZS with two racks clamped against each other by a spring is intended for reducing the backlash between the rack ZS and a gearwheel ZR2 or pinion R2 driving said rack.

It is also not important whether the recording medium is a rotating recording medium, or the recording medium is guided in a transversal movement over the movable writing or reading system PU.

Figure 1:
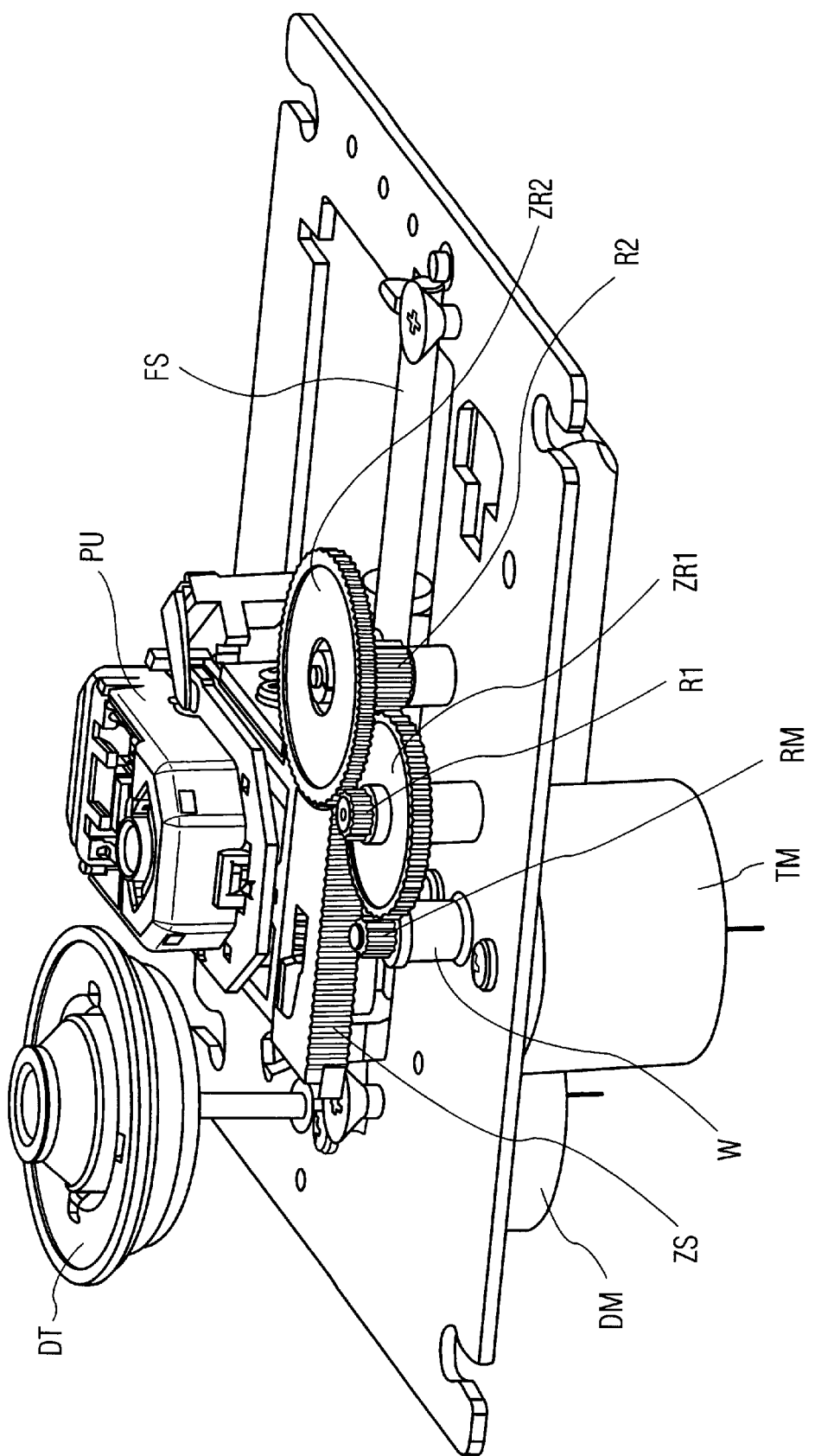
FIG. 1 shows a basic diagram of a CD-Mechadeck.

The drive of the rack ZS represented in FIG. 1, via a plurality of gearwheels ZR1, ZR2 and pinions RM, R1, R2, is intended for accomplishing a corresponding transmission step-up between the rotational speed of the coarse drive motor TM and the speed with which the carriage or the rack ZS is moved.

Also possible in principle, however, is a design in which the rack ZS is driven directly by a pinion RM. According to the design corresponding to FIGS. 1 to 4, the rack ZS is driven by a pinion R2.

The terms pinion and rack are used synonymously in this application, since they merely express a comparison of the number of teeth and a pinion becomes a rack if a relationship with a greater number of teeth cannot be established, as in the case when the rack ZS is driven by only one pinion RM, which may be a gearwheel. Analogously, the pinion R2 could be a gearwheel ZR2, if the gearwheel ZR2 does not have a comparatively greater toothed rim and the pinion R2 is the driving gearwheel.

Figure 2:
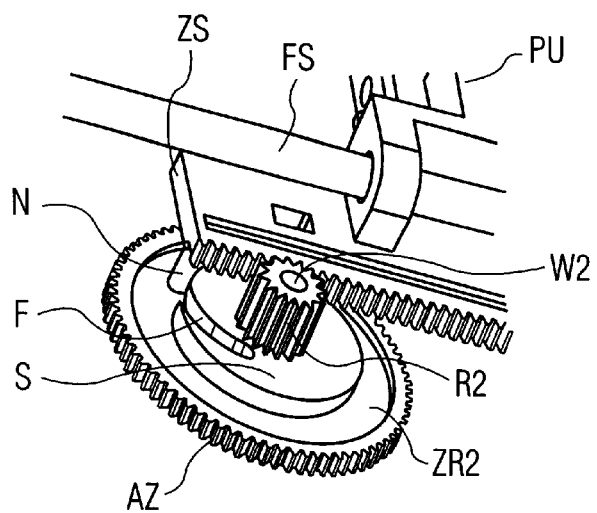
FIG. 2 shows a basic diagram of an engagement securing system in a position shortly before engagement.
Figure 3:
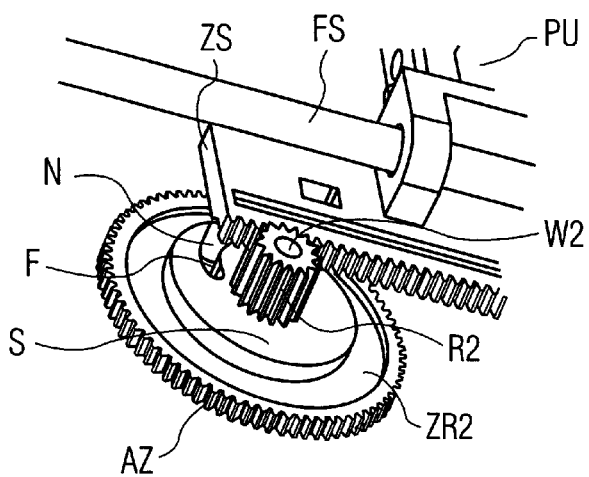
FIG. 3 shows a basic diagram of the engagement securing system in an engagement position.
Figure 4:
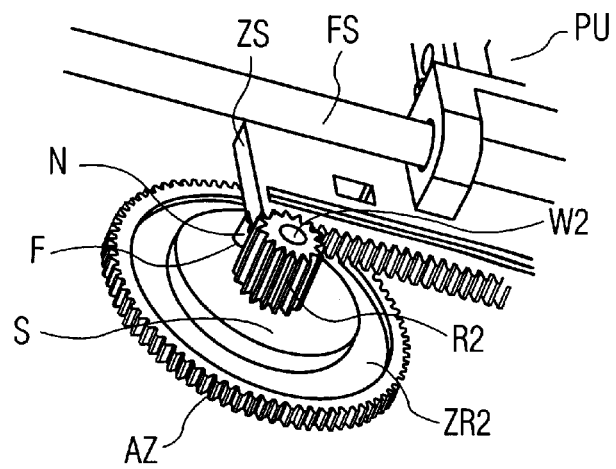
FIG. 4 shows a basic diagram of the engagement securing system in an end-of-engagement position.

In order to provide a power transmission system with a gearwheel or pinion R2 and a toothed rack ZS which ensures increased power transmission and protection of the toothing, an engagement securing system is provided, the basic construction of which is represented in FIGS. 2 to 4.

The engagement securing system comprises a lug N, which is arranged on the rack ZS and is intended to engage in a guide F connected to the gearwheel ZR2 or pinion R2. This guide F is formed by a groove which is arranged, for example, in a disk S connected to the pinion R2. The path followed by the groove or the guide F is adapted to the movement which the lug N describes on the disk S during the rolling of the pinion R2 on the rack ZS. The movement or the path of the guide F is determined by the transmission ratio between the rack ZS and pinion R2 and the distance from the lug N to the front of the rack ZS. The lug N and the guide F are matched to one another in such a way as to ensure that the lug N slides in the guide F without any backlash while the pinion R2 rolls on the rack ZS without any backlash. The path followed by the guide F or the groove in the disk S is determined correspondingly. The disk S has a diameter which is greater than the diameter of the pinion R2, by which it is guided on a common spindle or a shaft W2. The diameter of the disk S determines the beginning of the operative range of the engagement securing system, the length of which is limited on the other hand by the diameter of the pinion R2. The operative range of the engagement securing system extends over a range thereby determined, which is therefore preferably provided in the end region of the rack ZS.

FIG. 2 shows the engagement securing system in a position shortly before engagement. In this position, the lug N, which is arranged at the end of the rack ZS and on the rack ZS, at a distance from the front of the rack ZS, is still outside the guide F of the disk S, and the rack ZS or the writing or reading system PU can still be moved from this position over a distance up to an end position represented in FIG. 4. To make it possible for the lug N to run into the guide F, the disk S has before the operative range of the engagement securing system a reduced radius in comparison with its maximum diameter. The path followed by the guide F or the groove in the disk S is represented in FIG. 2, and FIGS. 3 and 4 show the movement up to the end-of-engagement position or up to the furthest position to which the rack ZS can be driven by the pinion R2.

The end-of-engagement position corresponding to FIG. 4 or a position in the operative range of the engagement securing system according to FIG. 3 is a position of the writing or reading system PU into which the writing or reading system PU is usually moved in the case of all known equipment before or after playing or recording. The writing or reading system PU is also located in such an end region during the transporting of the equipment.

During transporting, unavoidable vibration and shock impact occur, and the equipment is to be fully functional even after it is accidentally dropped from a certain height.

In the case of known equipment without an engagement securing system, tests in which the equipment was subjected to 80 times acceleration due to gravity showed that the toothing of the rack and/or gearwheel was damaged and, as a result, the equipment was no longer able to function. 80 times acceleration due to gravity corresponds to dropping the equipment from a height of approximately 60 cm. By contrast, equipment with the engagement securing system withstood the test undamaged.

The engagement securing system, which does not require any additional individual parts since the lug N is a component part of the rack ZS and the disk S is a component part of the pinion R2 or of the gearwheel driving the rack, can therefore be used advantageously as an automatic transport securing system.

The automatic transport securement is ensured by the writing/reading system PU being in a position in the operative range of the engagement securing system during transport and, as a result, the transport securement is automatically set without any additional measures.

With regard to the action of the engagement securing system, the starting point is that a so-called chattering of the teeth of the rack ZS over the teeth of the pinion R2 or of the gearwheel is prevented by the engagement securing system. This effect is achieved by the rack ZS and the gearwheel driving it being clamped to each other by the engagement securing system. A pinion R2, guided on a shaft W2 clamped at one end, cannot be forced away from the rack ZS, so that chattering over the teeth is prevented.

The engagement securing system ensures that the teeth of the rack ZS and pinion R2 or gearwheel always remain in engagement, even while forces originating from an acceleration of the writing or reading system connected to the rack ZS are acting on the rack ZS. As a result, increased power transmission between the rack ZS and the gearwheel driving it is also made possible. This may be used advantageously in order to drive a loading or unloading device for the recording medium by the rack ZS or the carriage carrying the writing or reading system PU. The power transmission system is then to be designed in such a way that a region in the middle of the operative range of the engagement securing system is used for transport securement and the end region of the operative range of the engagement securing system is used for driving the loading or unloading or removal device for the recording medium. As a result, an additional drive for the loading or unloading system is advantageously saved.

It should be mentioned once again that the terms pinion and gearwheel are used synonymously in this description, since the pinion R2 of the gearwheel ZR2 may likewise be referred to as a gearwheel if it has no outer toothed rim AZ. The outer toothed rim AZ is not required if the pinion R2 is driven directly, which means without an additional gearwheel ZR1.

The use and design of the engagement securing system according to the invention are not restricted to the exemplary embodiment specified here.

What is claimed is:

1. Power transmission system with a gearwheel and a toothed rack for movable writing or reading systems for optical recording media, comprising:

an engagement securing system that ensures that the gearwheel and toothed rack remain in engagement in an end region of the rack, wherein the engagement securing system is formed by a lug disposed on the rack and adapted to engage in a guide connected to the gearwheel.

2. Power transmission system according to claim 1, wherein the guide connected to the gearwheel is a groove which is provided in a disk connected to the gearwheel.

3. Power transmission system according to claim 1, wherein the engagement securing system is intended as a power transmission means for providing increased power transmission in the end region of the rack.

4. Power transmission system according to claim 1, wherein the engagement securing system is intended as a power transmission means for providing increased power transmission in the end region of the rack for driving a loading or unloading device for moving an optical recording medium.

5. Power transmission system according to claim 1, wherein the engagement securing system is intended as a power transmission means for providing increased power transmission in the end region of the rack, the engagement securing system is formed by a lug disposed on the rack and adapted to engage a guide connected to the gearwheel, the guide comprising a groove which is provided in a disk connected to the gearwheel.

6. Power transmission system according to claim 1, wherein the gearwheel is guided on a shaft clamped at one end and the engagement securing system is provided in the end region of the rack.

7. Power transmission system according to claim 1, wherein the lug engages the guide in an end region of the rack, and the lug and a shaft of the gearwheel are arranged in a non-parallel line to the toothed rack.

8. Power transmission system according to claim 1, wherein the lug engages the guide in an end region of the rack and the lug and a shaft of the gearwheel are arranged to form a perpendicular line to the toothed rack in the end region of the rack.

9. Power transmission system according to claim 2, wherein the gearwheel is guided on a shaft clamped at one end and the engagement securing system is provided in the end region of the rack.

10. Power transmission system comprising a gearwheel guided on a shaft clamped at one end, a toothed rack operatively coupled to the gearwheel, and an engagement securing system that ensures that the gearwheel and toothed rack remain in engagement in an end region of the rack, wherein the engagement securing system is formed by a lug disposed on the rack and adapted to engage a guide connected to the gearwheel.

11. Power transmission system according to claim 10, wherein the guide connected to the gearwheel is a groove which is provided in a disk connected to the gearwheel.

12. A power transmission apparatus comprising:

a carriage for translating utilization means;

a rack having gear teeth thereon attached to said carriage;

a gear wheel arranged for engagement with said rack, and coupled to a power source, for conditioning said rack for linear translation;

a lug attached proximate to one end of said rack;

a grooved element attached to said gear wheel, said grooved element arranged to engage said lug to constrain said rack and said gear wheel in engaged relation when said gear wheel is proximate said one end of said rack.

13. The power transmission apparatus set forth in claim 12 wherein said grooved element is constructed integral with said gear wheel.

* * * * *